Oct. 7, 1924.                                                       1,511,059
                          H. F. MARANVILLE
     METHOD OF AND APPARATUS FOR COATING AND DRYING TIRE BEAD RINGS
               Original Filed July 22, 1919    2 Sheets-Sheet 1
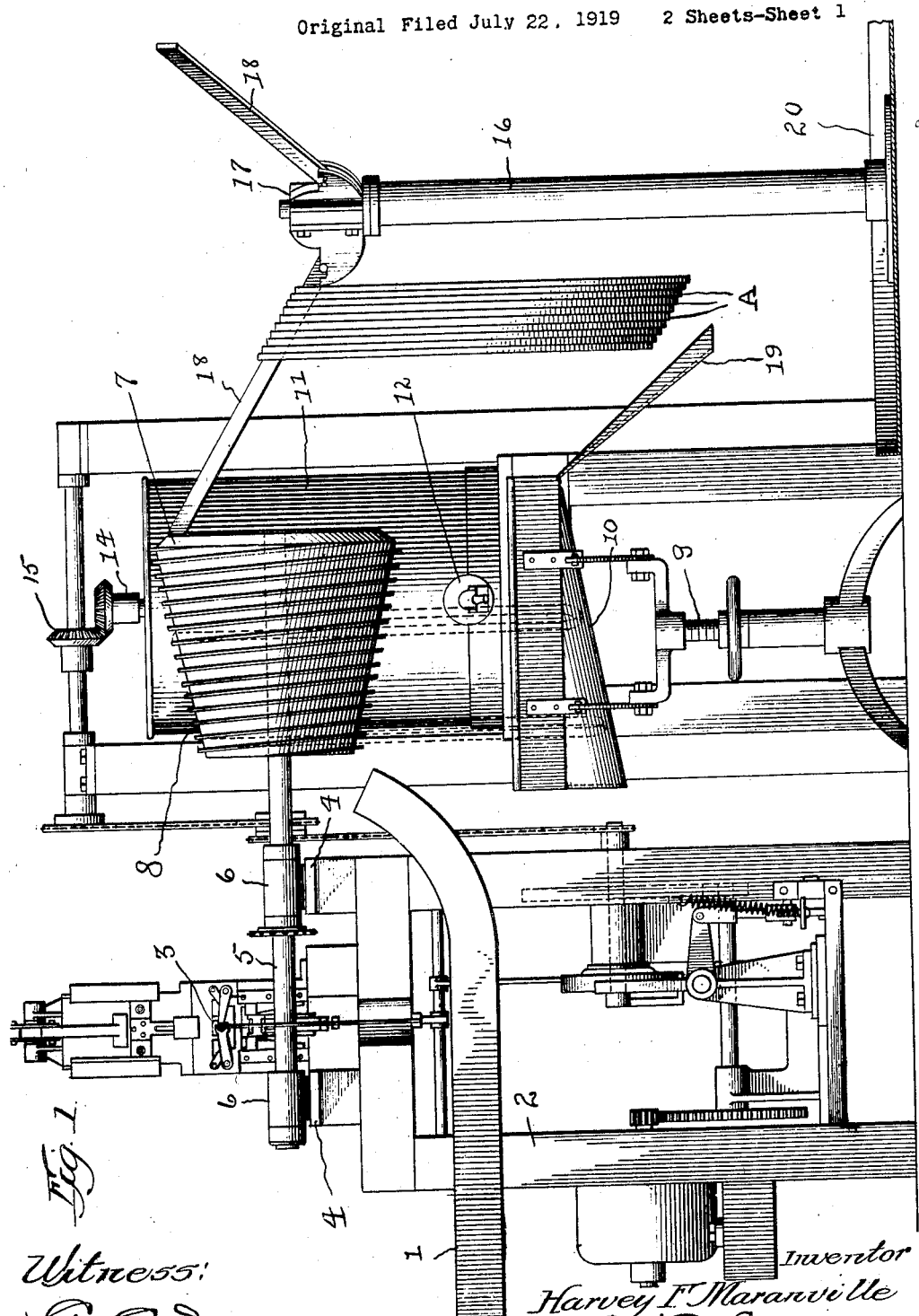

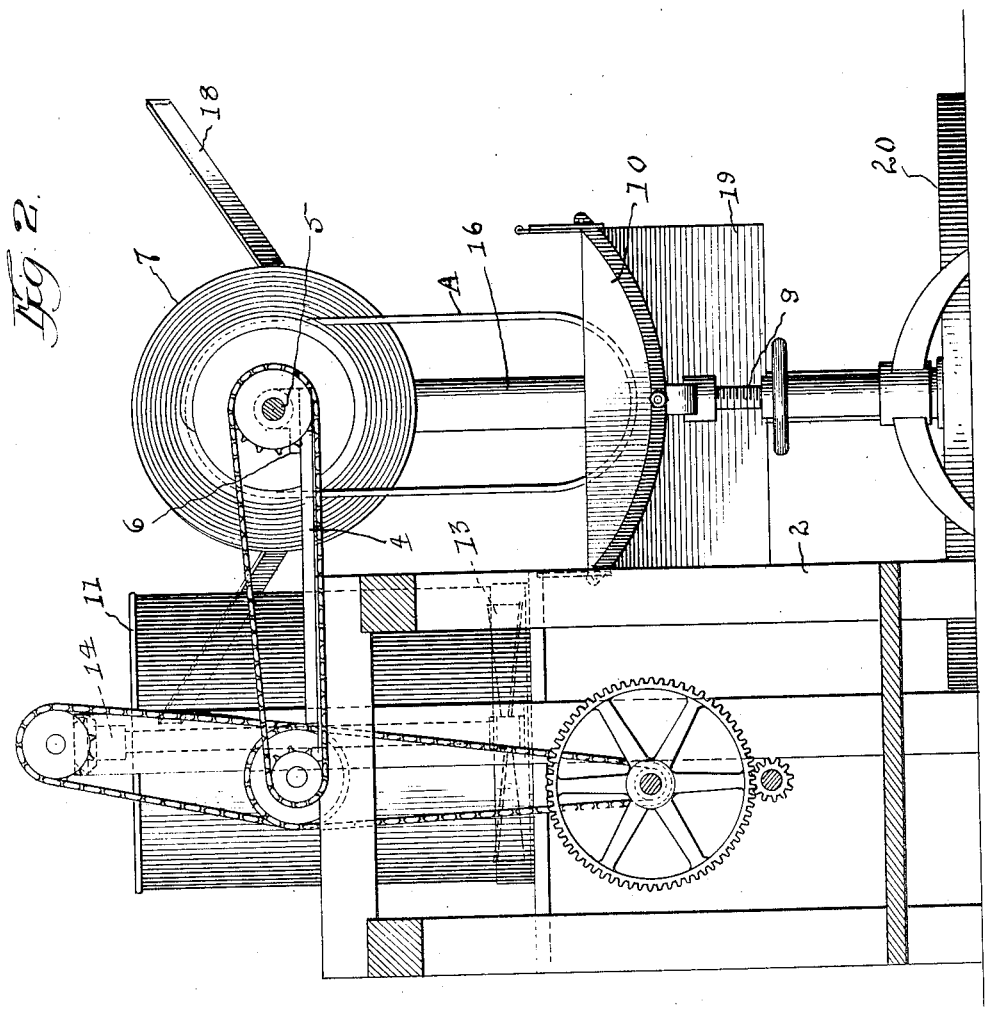

Patented Oct. 7, 1924.

1,511,059

UNITED STATES PATENT OFFICE.

HARVEY F. MARANVILLE, OF AKRON, OHIO, ASSIGNOR TO THE FIRESTONE TIRE AND RUBBER COMPANY, OF AKRON, OHIO, A CORPORATION OF OHIO.

METHOD OF AND APPARATUS FOR COATING AND DRYING TIRE-BEAD RINGS.

Original application filed July 22, 1919, Serial No. 312,474, Patent No. 1,451,169. Divided and this application filed November 3, 1919. Serial No. 335,513.

*To all whom it may concern:*

Be it known that I, HARVEY F. MARANVILLE, a citizen of the United States, residing at Akron, in the county of Summit, State of Ohio, have invented certain new and useful Improvements in Methods of and Apparatus for Coating and Drying Tire-Bead Rings, of which the following is a specification.

This invention relates to devices for dipping or coating tire beads with rubber cement and is intended as an improvement over methods heretofore in use in the coating of the bead. It has been the practice, prior to my invention, to dip by hand a mass of tire beads in a bath of rubber cement and then place them on racks or pegs to dry. This is a very awkward and messy way of coating the beads, is wasteful of the cement and the tacky, stringy cement soon covers the racks, floors and operators. By the machine disclosed herein the operation is performed quickly and neatly and the beads are dried with the minimum amount of contact, thereby making possible easy separation without danger of injury to the beads.

The apparatus set forth herein is shown in my prior application, Serial No. 312,474, filed July 22, 1919, of which this application is a division, the said application being directed to a combination bead stapling and coating apparatus, whereas this application is directed to the coating and drying of the beads.

An object of the invention is to coat the beads thoroughly, covering each portion of its surface, and to dry the beads in such manner that a minimum amount of floor space will be required without requiring the beads to come in contact with one another to such an extent that they will adhere too greatly to be separable without injury.

Other objects and advantages will appear as the description proceeds, and changes and modifications may be made without departing from the spirit of the invention or sacrificing any of its benefits, it being understood that the form of apparatus shown is illustrative of the invention merely and the details are non-essential.

While the machine is shown and described as adapted for the coating of tire beads, it is obvious that it is capable of other uses and is adaptable for other purposes.

In the drawings:

Fig. 1 is a front elevation of the machine.

Fig. 2 is a vertical section at right angles to the plane of Fig. 1, the section being taken at the side of the stapling machine.

In the machine shown in my former application, bead strips cut to proper lengths are circled and the ends placed in contact and a staple or similar fastening device is driven through the joint, whereby a ring of bead material is formed. The ring is then passed over to a dipping apparatus in which it is coated with cement and then to a drying rack. The stapling machine is fully described in the said application and will not be gone into more fully here than is necessary for an understanding of this apparatus.

The bead strips as they are received from the bead forming apparatus, and cut to the proper length, are placed in a trough shaped receptacle 1 on the frame work 2 of the stapling machine. The bead strip is then circled and the ends brought together and placed on an anvil 3 where the stapling operation is performed making the bead strip into a complete ring A.

Projecting from the framework of the machine 2 is a pair of horizontal arms 4 in the outer ends of which is received a rotating shaft 5 supported in bearings 6. The shaft 5 is constantly driven in any suitable manner, preferably from the motor which operates the stapling machine, and carries on its outer end a drum 7.

The stapled beads in ring form are lifted from the anvil, turned through an angle of 90° and dropped on the rotating drum 7. This drum may be of any preferred form, that shown being the frustrum of a cone placed with the smaller end toward the stapling machine, and provided with a spiral groove 8.

Beneath the drum 7 and supported by adjusting screw 9, is a tank 10, the bottom whereof may be sloped upwardly to parallel the upper line of the drum. The tank is kept filled with rubber cement from a reservoir 11 through a nozzle 12. Within the reservoir is located a stirrer or agitator 13 on the end of a vertical shaft 14, driven by bevel pinions 15 which are rotated from the motor by any suitable driving mechanism.

The height of the tank 10 relative to the drum is so adjusted that the lowermost portion of the bead will dip into the cement in the tank, and as the rotation of the drum carries the bead forward, it dips all portions of the bead surface in the tank and finally carries the bead out of the cement.

Arranged at one side of the tank is a post or upright 16 on the upper end of which is supported a rotating head 17, which is designed to support a plurality of removable arms 18, the construction being such that the arms incline upwardly from the center of the head. The outer end of each arm, when the bead is at the proper position, is arranged in close proximity to the larger or discharge end of the drum 7 and as it rotates in the direction to advance the bead through the trough, the bead is lifted out of the cement and drops off the drum on to the arm. The beads accumulate on the arm 18 in the manner shown in Fig. 1, the drip being caught by a pan 19 depending from the tank 10 and by a pan 20 surrounding the post.

When an arm is full, the head 17 is rotated and a new arm brought into position to receive the beads. When the arms have been filled and allowed to drip a short time, the beads are comparatively dry and the arms may be removed from the head and placed in a location where the drying is completed.

The angle of the arms 18 is such that as the wet beads hang, an edge contact only is obtained. This is an immense advance over the prior practice as it does not permit the beads to become stuck or matted together, an incident of frequent occurrence in the promiscuous handling of the beads which has taken place heretofore. Furthermore, the drip from the beads is all caught in one place and the bead room presents a neater and more sanitary appearance.

Alterations and modification may be made in the exact form of this invention and it is the intention to cover all forms of the invention which fall within the purview of the appended claims.

I claim:

1. A machine for coating articles of the character set forth comprising, a tank, a drum located above the tank, a spiral groove on said drum and means for rotating the drum.

2. A machine for coating articles of the character set forth comprising, a tank, a frusto conical drum above the tank, means for rotating the drum, a spiral groove about the drum.

3. A machine for coating and drying articles of the character set forth, comprising a tank, means for carrying the articles through the tank and rotating them therein, and a drying rack having a plurality of inclined arms to which the carrying means discharges.

4. An apparatus for coating and drying rings of bead material comprising, a tank, a conveyor for dipping a portion of the bead in the tank and rotating the bead while in the tank, and a drying rack to which the conveyor delivers, said rack comprising an inclined arm on which the beads are stacked.

5. An apparatus for coating and drying rings of bead material comprising, a tank, a conveyor for dipping a portion of the bead in the tank and for rotating the bead in its travel, and a drying rack to which the conveyor delivers, said rack being arranged to maintain said beads with an edge contact only while drying.

6. An apparatus for coating and drying rings of bead material comprising, a tank, a rotating drum located above the tank on which the rings are hung, a spiral groove on said drum, and a rack to which said drum delivers the rings, said rack comprising a downwardly inclined arm.

7. An apparatus for coating and drying rings of bead material comprising, a tank, a rotating drum located above the tank, on which drum the rings are hung, a spiral groove on said drum, and a drying rack to which the drum delivers the rings, comprising a rotatable head and a plurality of inclined arms on said head.

8. An apparatus for coating and drying rings of bead material comprising, a tank, a rotating frusto-conical drum located above the tank, on which drum the rings are hung, a spiral groove on said drum, a drying rack to which the drum delivers the rings, comprising a rotatable head and a plurality of inclined arms on said head.

9. In an apparatus for coating tire beads in ring form, the combination of a bath, means for suspending the bead ring above the bath with the lower portion of the ring in the bath, means for rotating the ring about its axis while in the bath, means for translating the bead through the bath, and means for gradually lifting the bead out of the bath in a plane inclined to the axis of the bead.

10. In an apparatus for coating tire beads in ring form, the combination of a bath, means for suspending the bead ring above the bath with the lower portion of the ring in the bath, and means for simultaneously rotating the ring about its axis while in the bath, and translating the bead through the bath in a plane inclined upwardly from the axis of the bead.

11. In an apparatus for coating tire beads in ring form, the combination of a bath, means for suspending the bead ring above the bath with the lower portion of the ring in the bath, and means for simultaneously rotating the ring about its axis while in the bath, translating the bead through the bath and gradually lifting the bead out of the bath.

12. The herein described method of coating pre-formed tire beads in ring form which consists in providing a coating bath, suspending a ring above the bath with the lower portion of the ring in the bath, rotating the ring about its axis while in the bath, and translating the bead ring through the bath in a direction inclined to the axis of the bead.

13. The herein described method of coating pre-formed tire beads in ring form which consists in providing a coating bath, suspending a ring above the bath with the lower portion of the ring in the bath, rotating the ring about its axis while in the bath, translating the bead ring through the bath, and lifting the bead ring out of the bath in a plane inclined to the axis of the bead.

14. The herein described method of coating pre-formed tire beads in ring form which consists in providing a coating bath, suspending a ring above the bath, simultaneously rotating the ring about its axis and translating it through the bath and lifting the ring out of the bath.

15. The herein described method of coating pre-formed tire beads in ring form which consists in providing a coating bath, suspending a ring above the bath, rotating the ring about its axis, and simultaneously translating it through the bath, and gradually lifting the ring out of the bath during the translation of the ring.

16. A machine for coating and drying articles, comprising a tank, means for suspending articles above the tank with the lower portion of the article submerged in the tank, and means for translating the articles through the tank in a direction parallel to the axis of the suspending means.

17. In an apparatus for coating tire beads in ring form, the combination of a bath, means for suspending the bead ring above the bath with the lower portion of the ring in the bath, and means for simultaneously translating the bead through the bath and gradually lifting the bead out of the bath.

18. An apparatus for coating and drying articles, comprising a tank, and a rotary conveyor for carrying the articles through the tank in a direction substantially parallel to the axis of the conveyor.

19. An apparatus for coating and drying articles, comprising a tank, and a conveyor mounted upon a fixed axis, said conveyor being constructed and arranged to convey articles through the tank in a direction longitudinally of the axis of the conveyor.

20. In an apparatus for coating tire beads in ring form, the combination of a bath, and rotary conveying means for supporting and carrying the beads through the bath with the lower part of the rings in the bath, said conveyor being fixed against horizontal and vertical displacement.

HARVEY F. MARANVILLE.